A. H. NILSON & M. OLSON.
WIRE BENDING MACHINE.
APPLICATION FILED JULY 7, 1909.

969,488.

Patented Sept. 6, 1910.
9 SHEETS—SHEET 1.

WITNESSES:
H. A. Lamb.
S. W. Atherton.

INVENTORS
Axel H. Nilson and
Mauritz Olson
BY
N. M. Wooster
ATTORNEY

A. H. NILSON & M. OLSON.
WIRE BENDING MACHINE.
APPLICATION FILED JULY 7, 1909.

969,488.

Patented Sept. 6, 1910.
9 SHEETS—SHEET 3.

Fig. 3.

WITNESSES:
H. A. Lamb
S. W. Atherton.

INVENTORS
Axel H. Nilson and
Mauritz Olson
BY
N. M. Wooster
ATTORNEY

A. H. NILSON & M. OLSON.
WIRE BENDING MACHINE.
APPLICATION FILED JULY 7, 1909.

969,488.

Patented Sept. 6, 1910.
9 SHEETS—SHEET 6.

WITNESSES:
H. A. Lamb.
S. W. Atherton.

INVENTORS
Axel H. Nilson and
Mauritz Olson
BY
_______________
ATTORNEY

A. H. NILSON & M. OLSON.
WIRE BENDING MACHINE.
APPLICATION FILED JULY 7, 1909.

969,488.

Patented Sept. 6, 1910.
9 SHEETS—SHEET 8.

WITNESSES:
H. A. Lamb.
S. W. Atherton.

INVENTORS
Axel H. Nilson and
Mauritz Olson
BY
N. M. Wooster
ATTORNEY

A. H. NILSON & M. OLSON.
WIRE BENDING MACHINE.
APPLICATION FILED JULY 7, 1909.

969,488.

Patented Sept. 6, 1910.
9 SHEETS—SHEET 9.

WITNESSES:
H. H. Lamb.
S. W. Atherton.

INVENTORS
Axel H. Nilson and
Maurity Olson.
BY
ATTORNEY

UNITED STATES PATENT OFFICE.

AXEL H. NILSON AND MAURITZ OLSON, OF BRIDGEPORT, CONNECTICUT, ASSIGNORS TO THE PREMIUM GLASS COMPANY, OF COFFEYVILLE, KANSAS, A CORPORATION OF KANSAS.

WIRE-BENDING MACHINE.

969,488.   Specification of Letters Patent.   Patented Sept. 6, 1910.

Application filed July 7, 1909. Serial No. 506,274.

*To all whom it may concern:*

Be it known that we, AXEL H. NILSON and MAURITZ OLSON, citizens of the United States, residing at Bridgeport, county of Fairfield, State of Connecticut, have invented an Improvement in Wire-Bending Machines, of which the following is a specification.

Figure 21:
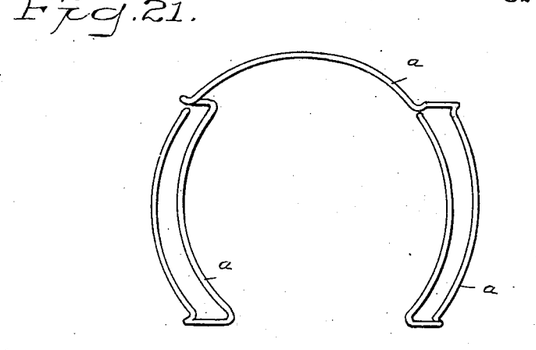
Fig. 21 is a perspective view of the article produced by the machine.

This invention relates to wire bending machinery and has particular reference to machines for making fruit jar clamps of the form illustrated in Figure 21 of the drawings. Said clamp is of the type shown in Patent No. 670,292, granted March 19, 1901.

One of the objects of the invention is to provide an automatic machine which will feed wire, cut it off in proper lengths, and form each length with a substantially rectangular loop at each end, and then curve the whole to a nearly cylindrical form.

Further objects are to provide improvements in details of construction tending to facilitate the operation of the machine and simplify the construction thereof and the cost of manufacture.

To these ends, the invention consists in the construction and combination of parts substantially as hereinafter described and claimed.

Of the accompanying drawings: —Fig. 1 is a plan view of a complete machine embodying the invention; Fig. 1$^a$ is a sectional detail view on line 1$^a$—1$^a$ of Fig. 1.

Similar reference characters indicate the same or similar parts in all of the views.

Figure 6:
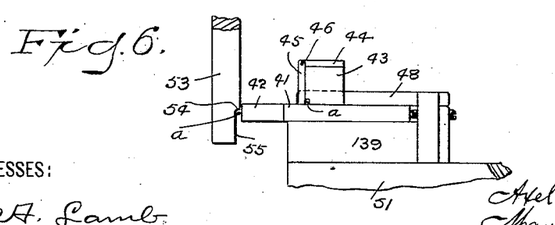
Fig. 6 is a side elevation from the right of Fig. 4.
Figure 12:
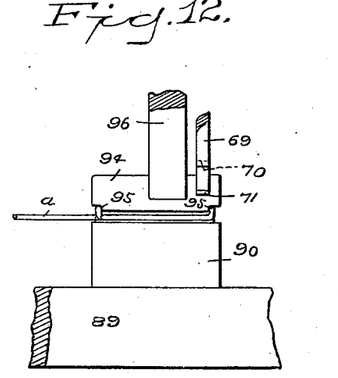
Fig. 12 is an elevation from the side of Fig. 11.
Figure 13:
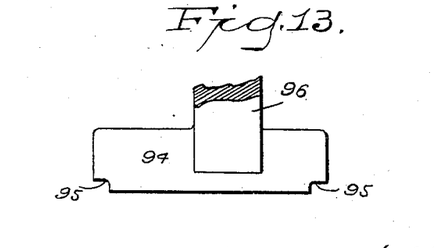
Fig. 13 is a detail side elevation of one of the pressers and strippers on a larger scale.
Figure 14:
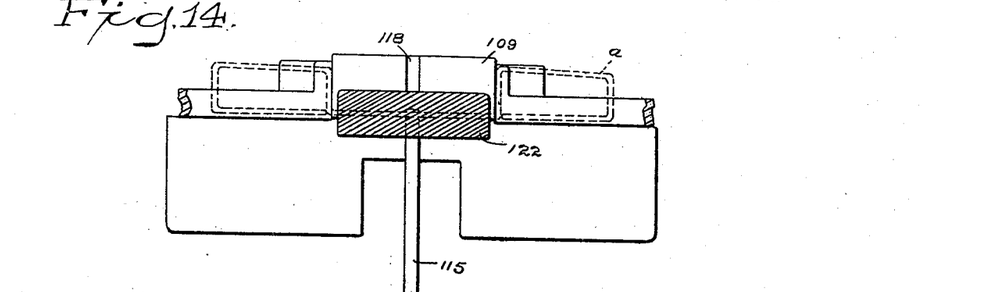
Fig. 14 is a detail plan, and part section, of the mechanism for curving the looped wire after it has been moved by the transferrer over the cylindrical former.
Figure 15:
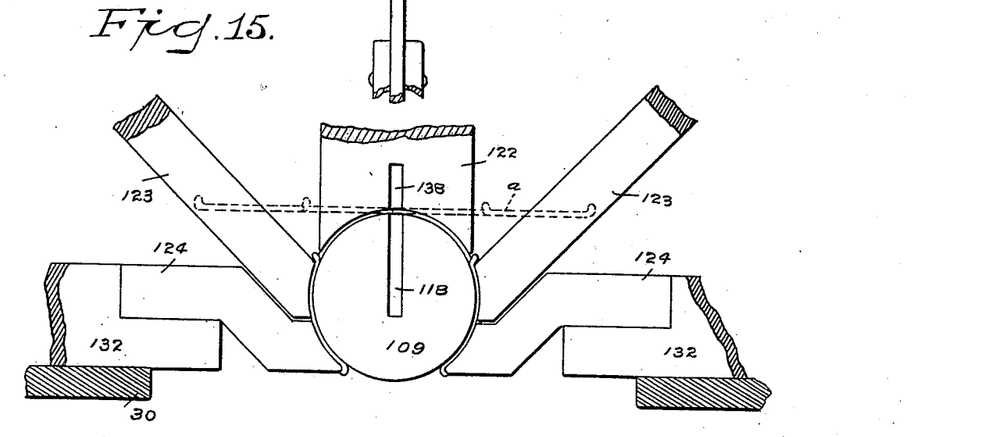
Fig. 15 is a front elevation of the same.
Figure 16:
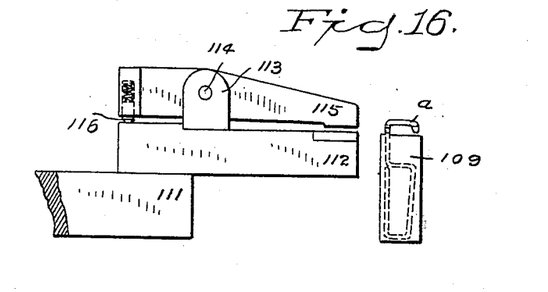
Fig. 16 is a detail side elevation of the cylindrical former and the transferrer jaws.

To facilitate an understanding of the machine, a brief description of the operation will be given before detailing the different mechanisms. A cut length of wire $a$ is first placed in the position shown by straight full lines in Fig. 4, which illustrates parts in the center of Fig. 1, but underneath the top of the machine. For the sake of brevity the cut length $a$ will be hereinafter usually referred to as the wire. The wire is next shifted to the position shown by straight dotted lines in said figure, where it occupies a lower plane than when first introduced. Fig. 6 illustrates the positions of two wires, one which has just been introduced and the other as having been shifted and lowered. The wire is then bent to the position shown by the angular full lines in Fig. 4. By means of two sets of bending punches acting successively the ends are then bent first to the dotted line position of Fig. 8 and then to the full line position of that figure, forming a loop at each end of the wire. The next operation offsets portions of the loops as shown in Fig. 12, and then the looped wire is transferred to place it over a circular former shown in Figs. 14, 15, 16 and 18 and is curved to the form shown in Fig. 21 and by full lines in Fig. 15.

Figures 1, 1A:
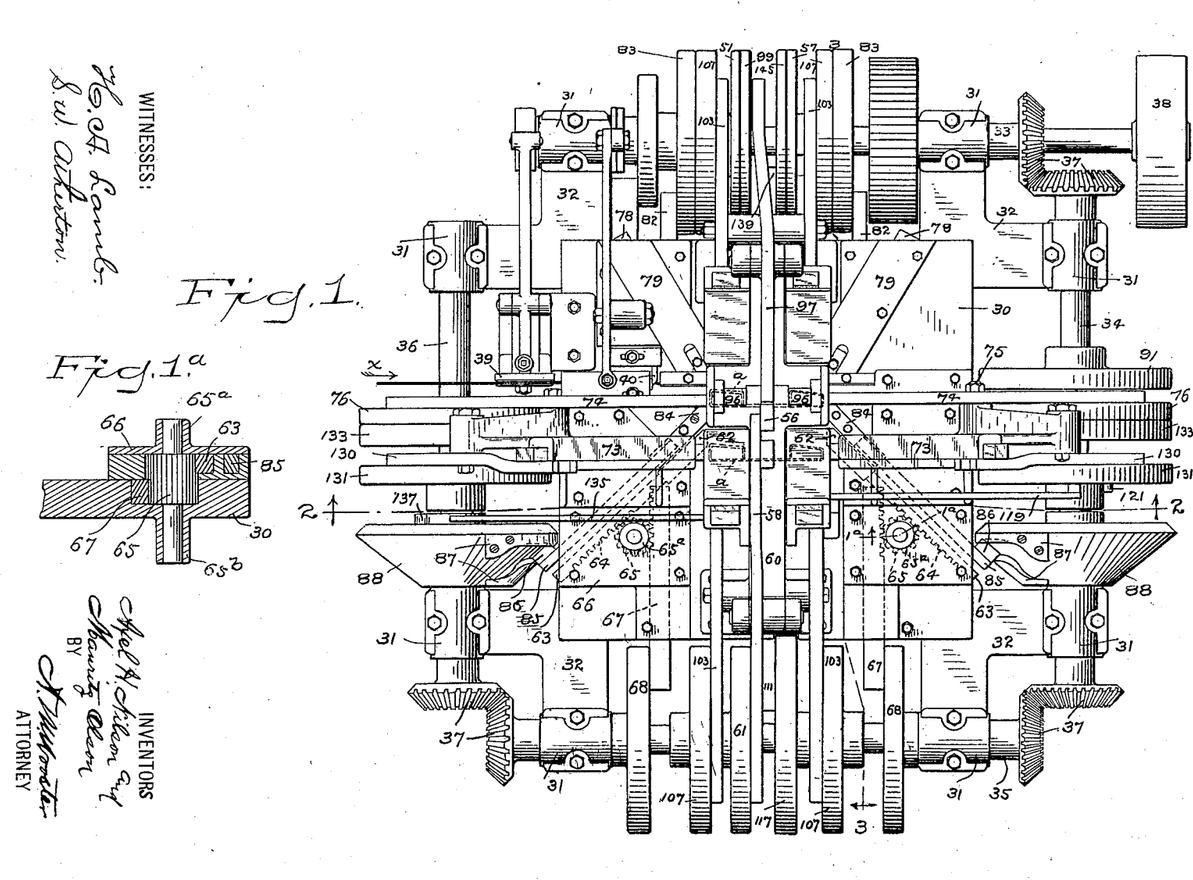

The bed or frame 30 of the machine is provided with bearings 31, shown as carried by brackets 32, for four shafts 33, 34, 35 and 36, which carry the cams for actuating the mechanism, said shafts being geared to rotate in unison by bevel gearing 37 at the angles, the four shafts being relatively arranged as a quadrangle as shown in Fig. 1. One of the shafts, as shaft 33, is driven in any suitable manner as by means of a belt on a pulley 38. In practice the shaft of belt pulley 38 is a countershaft suitably geared to shaft 33, but as this forms no part of the present invention no attempt has been made to illustrate the specific driving connections.

The wire enters the machine from a suitable straightening device (not shown) in the direction of the arrow $x$ in Fig. 1, and is intermittently advanced by a feed mechanism 39 and is severed by a cutter 40. The feed and cutter mechanisms form no part of the present invention and need not be described in detail, for any suitable devices may be employed for performing the functions of introducing the wire and placing cut lengths successively in position to be operated upon by the automatic devices hereinafter described.

Figures 4, 5, 7:
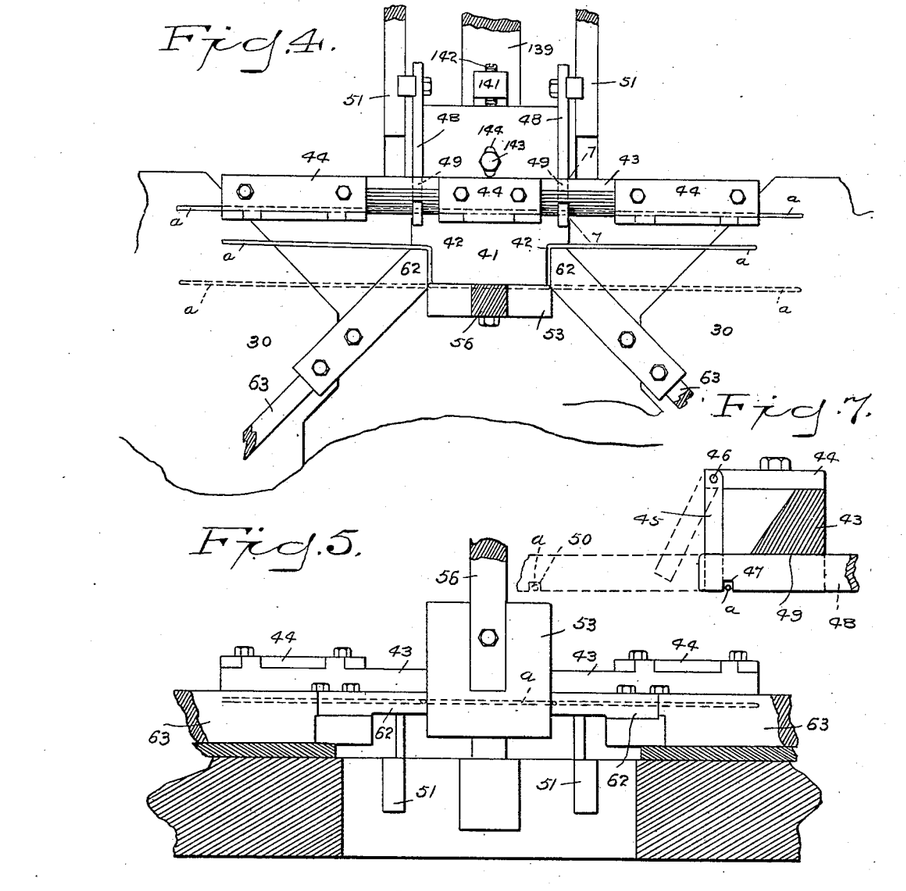
Fig. 4 is a detail plan view of some of the mechanism at the center of the machine, omitting some adjacent parts to avoid confusion.
Fig. 5 is a front elevation of the parts shown in Fig. 4.
Fig. 7 represents an enlarged section on line 7—7 of Fig. 4.

The position first occupied by the cut length of wire $a$ is best illustrated in Fig. 4 by the straight lines. This figure also illustrates a straight dotted line position of the wire, and also a partially bent second wire $a$ by full lines, because in the operation of the machine the timing is such that when a length of wire has reached the partially bent position, another length has just been inserted to the position indicated by full straight lines.

Figure 17:
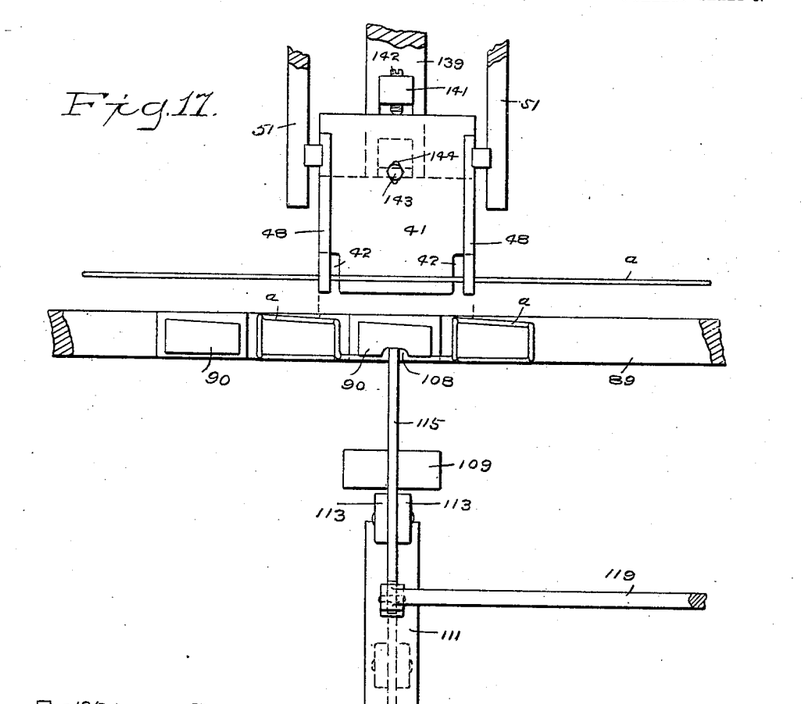
Fig. 17 is a detail plan view of some of the parts shown in Fig. 4, but showing also the anvils for the loops, and the transferrer.

When the wire is fed to the first position, it rests on the bed 30 and also on a former block 41 at the center, said former block having angular recesses 42 at its front corners as shown in Figs. 4 and 17, for a purpose presently to be described. The former block 41 has a reciprocatory movement as hereinafter described. A guide for the wire comprises a strip or piece 43 fixedly secured in position and having cap plates 44 to the front edges of which trap plates 45 are hinged at 46. The front lower corner of the guide 43 is recessed as shown at 47 in Fig. 7 and a third side of the recess is formed by the lower portion of the trap plates 45, so that the wire enters and passes along a guiding recess the front wall of which, consisting of the trap plates 45, may open automatically when the wire is pushed laterally to the dotted line position of Fig. 4. The devices to do this comprise two push arms 48 the front ends of which reciprocate in transverse recesses 49 formed in the guide piece 43. These push arms are formed with notches or recesses 50 (see dotted lines Fig. 7) which, when the said arms are in their retracted position, are in alinement with the recess 47 of guide 43 so that the wire may be fed in. The arms 48 are connected to slides 51 which are actuated by cams 52 carried by shaft 33 (see Fig. 1).

When the push arms 48 are advanced as indicated by dotted lines in Fig. 7, they push the wire laterally out of the recess 47 (the trap plates 45 swinging to permit this) until said wire reaches the front edge of the former block 41. The wire then drops over the edge of said block, its ends resting on suitable portions of the bed, with its center in front of the front edge of the former block as shown at the left in Fig. 6. To render this dropping positive and to make the wire move quickly, which it might not always do if dependent upon gravity, a presser 53 is mounted to be actuated vertically in front of the former block, said presser having a shoulder 54 which positively carries the wire downward. It is to be understood that when the wire is pushed laterally by the arms 48, the presser 53 is elevated so that its shoulder 54 is above the plane of the former block 41 sufficiently to admit the wire under said shoulder, the portion of the presser which is below the said shoulder forming a wall 55 which acts as a stop to limit the lateral movement of the wire under the influence of the push arms 48. This wall portion 55 also acts to hold the middle portion of the wire from buckling during the operation of the dies or punches presently to be described. The presser and holding member 53 is secured to a vertical slide 56 the upper end of which has a slide engaged by a slot 57 in lever 58 pivoted at 59 to a frame bracket 60 (see Figs. 1 and 3), said lever being actuated by having a roll engaging a groove in a disk cam 61 on shaft 35. The timing of the operation of the presser and holding member 53 is such that the instant the wire is pushed off from the front edge of the former block, the shoulder 52 engages it and carries it down as far as permitted by the portions of the bed on which the ends of the wire then rest, and this position brings the wire in front of the former block ready to be bent into the angular recesses 42 by devices which will now be described.

The wire being in the position indicated by dotted lines in Figs. 4 and 5, portions of it are next forced into the recesses of block 41 by a pair of punches 62 secured to the ends of slides 63 (see Figs. 4 and 5). The rear end of each of the slides 63 is formed with rack teeth 64 (see dotted lines in Fig. 1) engaged by a pinion 65 mounted in the frame of the machine below a cap plate 66 (see also Fig. 1ª). The bearings for the shaft of said pinion are shown at 65ª and 65ᵇ. This pinion has a vertical dimension sufficient to enable a portion of it to be engaged by rack teeth of a slide 67 which is actuated by a cam-grooved disk 68 on shaft 35. The two disks 68 are so formed as to cause the punches 62 to reciprocate between the positions shown by comparing Figs. 4 and 8, the advance movements of the two punches bending the wire into the corner recesses 42 of the former block 41 as shown in Fig. 4, while said block is in its advanced position.

Figure 8:
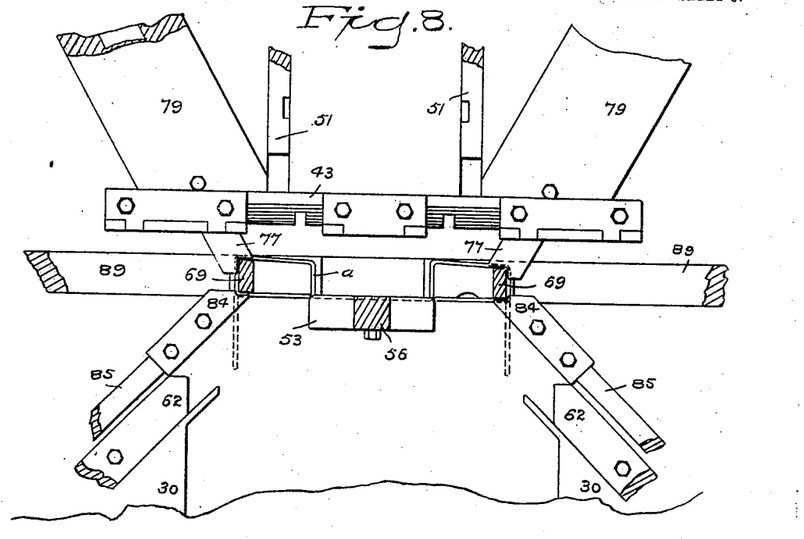
Fig. 8 is a view similar to Fig. 4, but illustrating parts which are omitted from Fig. 4.
Figure 9:
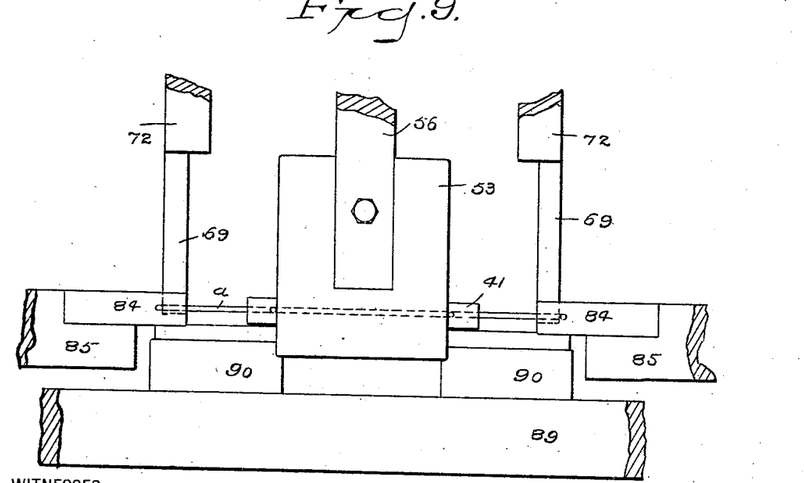
Fig. 9 is a front elevation of the parts shown in Fig. 8.

The next step is to loop the ends of the wire as shown in Fig. 8. Before the punches which do the bending can act, however, it is necessary to bring two formers into position to coact with those punches. These formers descend from above at the proper time. They are indicated at 69 in Figs. 8, 9, 10, 11 and 12, each being recessed as at 70 to straddle the presser and stripper hereinafter described, the tip portion around which the wire is bent being indicated at 71. Each former 69 is attached to the lower end of a slide 72 working in ways in a superstructure 73 (see Fig. 2) which is supported by brackets rising from the bed 30 of the machine. The bracket 60 hereinbefore referred to forms a part of this superstructure. As the details of said superstructure or upper part of the frame are not important, further description thereof will be unnecessary. The slides 72 are actuated by levers 74 pivoted at 75 and having rolls engaging cam grooves in disks 76 secured to the shafts 34 and 36 (see Fig. 1). The grooves in said disks are so shaped as to give the movements to the former 69 properly timed as hereinafter explained.

Figures 19, 20:
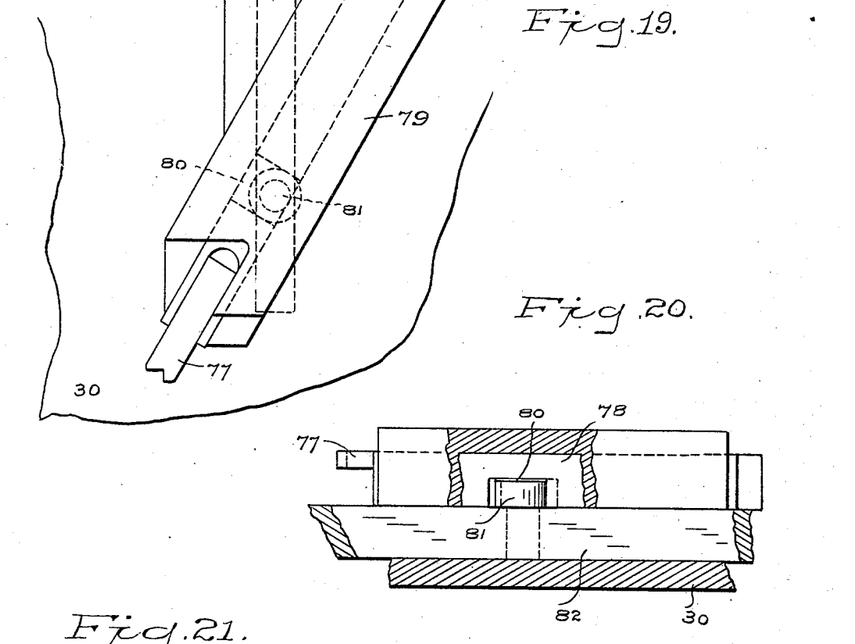
Figs. 19 and 20 are detail plan and sectional views of one of the rear bending punches and its operating mechanism.

After the punches 62 have acted as shown in Fig. 4, they retreat and the wire is still held between the front edge of block 41 and the wall 55 of member 53. Then the formers 69 descend to the position shown in Figs. 8 and 9. Then bending punches 77 advance and bend the outer portions of the wire around as indicated by dotted lines in Fig. 8. Referring also to Figs. 1, 19 and 20, it will be seen that these punches 77 are carried by slides 78 working in ways 79 on the bed of the machine. Each slide 78 has a transverse groove 80 which receives a roll 81 carried by another slide 82 mounted underneath, and at an angle to slide 78, the outer ends of the two slides 82 being actuated by cam-grooved disks 83 on the shaft 33. As the slides 82 advance and recede, their rolls 81 engage the walls of transverse grooves 80 and reciprocate the slides 78 so that the punches 77, which have angular recesses as shown in Fig. 8, carry the end portions of the wire around to the positions indicated by dotted lines in that figure. It is to be understood that the timing of the operation is such that the punches 77 act soon after the punches 62 have commenced to recede, and before the bending punches 84, which will now be described, have reached their forward position shown in Fig. 8. The said bending punches 84 are carried at the ends of slides 85 mounted in suitable ways in the frame and having blocks or rolls 86 at their outer ends which are engaged by cam lugs 87 on the cones 88 secured to shafts 34 and 36 (Fig. 1). These cone cams act to advance the punches 84 quickly, and at the proper time, to bend the end portions of the wire to the positions shown by full lines in Fig. 8, after which the punches are quickly retracted and remain at rest for a considerable time during the further revolution of the cam cones. At this period of operation of the machine, the wire is formed with a loop at each end, which loop is substantially rectangular but not quite so. It will be noticed that each loop tapers slightly toward the right. This is effected simply by the specific shapes given to the angular recesses 42, punches 62, formers 69 and punches 77 and 84. This shape is desirable in the wire clamp made by this machine, it not being necessary to explain why, herein. As will be readily understood, materially different shapes can be produced by changing the punches and formers; therefore, said punches and formers are removably connected with their slides as indicated in the drawings.

Figure 10:
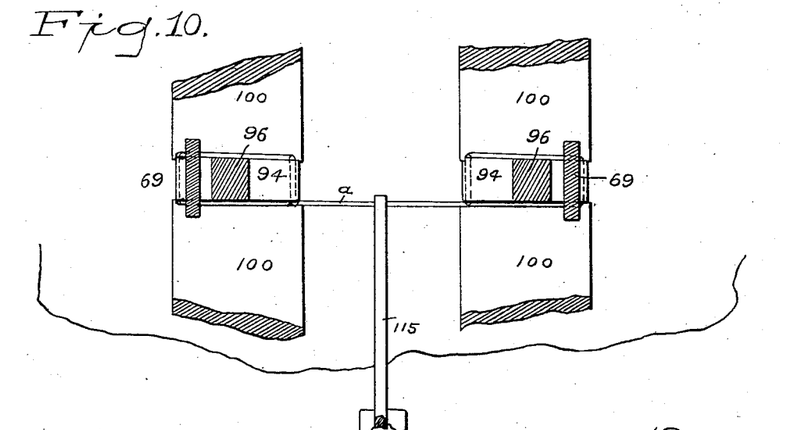
Fig. 10 is a somewhat diagrammatic detail plan and part section of the anvils and presser feet for holding the loops while portions thereof are being offset, said figure also showing the transferrer in position for taking hold of the wire.
Figure 11:
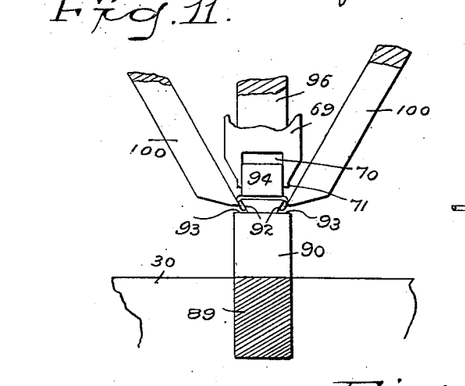
Fig. 11 is an elevation from the right of Fig. 10, but omitting the transferrer, and showing the offsetting punches.

The next step in the operation of the machine is to offset portions of the wire so that all transverse portions will be in a different plane from that of the longitudinal portions. The means for doing this will now be described. A slide 89 having two anvil blocks 90 the two longer sides of each of which are undercut as shown in Fig. 11, is actuated by a cam groove in the side of a disk 91 (see Fig. 1), secured to the shaft 34. The undercut portions of the anvils are indicated at 92 in Fig. 11 and the shoulders at 93. When out of position for operation, the anvils occupy the position shown in Fig. 17. When in position to support the loops while being off-set, they occupy the position shown in Figs. 8 and 9. When in this last mentioned position, they support the loops against the action of the offsetting punches presently described, and also against the action of the pressers 94 (Figs. 10 to 13) which have end recesses 95 that receive the transverse or end portions of the loops. Each presser is carried at the lower end of a slide 96 mounted in ways in the superstructure, the two slides extending upon opposite sides of, and actuated by, a lever 97 (see Figs. 1 and 3) pivoted at 98 to one of the superstructure brackets and actuated by a cam groove in a disk 99 carried by shaft 33. The pressers have a width to enter the loops, as shown in Fig. 11, the recessed ends of the pressers bearing on the transverse portions of the wire as shown in Fig. 12. When the pressers first move, however, to the position shown in said Figs. 11 and 12, the side or longitudinal portions of the loops have not been pressed down to the positions shown in those figures, but all portions of the wire are in one plane. The carrying down of the longitudinal portions of the wire is effected by the offsetting punches 100 which, as shown in Fig. 10, have a width to not only engage the sides of the loops but to also just engage the ends of the portion of the wire which connects the two loops so that when said offsetting punches act, they depress all portions of the wire except the transverse portions which are supported across the tops of the anvils 90. As the sides of said anvils are undercut, as before described, they permit the sides of the loops to be bent down abruptly as shown in Fig. 11.

The punches 100 are carried by the lower ends of slides 101 (see Fig. 3) mounted in ways 102 on the superstructure, said slides being actuated by levers 103 pivoted at 104 and having rolls 105 engaging cam grooves 106 in disks 107 carried by shafts 33 and 35. When the punches 100 reach the position shown in Fig. 11, the longer sides of the loops are pressed down over the undercut sides 92 of the anvils and almost into contact with the shoulders 93. Then when the anvils are shifted along to the position shown in Fig. 17, the wire will not drop enough to permit the transverse portions of the loops to be disengaged from the recesses 95 of the pressers, because the shoulders 93 will support the loops until the transferrer jaws hereinafter described have taken hold of the portion of the wire between the loops. Therefore, the pressers act as strippers in that they strip the wire loops from the anvils when the latter move aside as described.

The next step is to remove the wire to position for the final operation of curving it. This is effected by a transferrer having a pair of jaws which grasp the wire at the center, one of the anvils 90 having a recess 108 (see Figs. 17 and 18), to permit this to be done. Said recess is provided because the slide 89 carrying the anvils has an extent of motion which, when the anvils are shifted out of the loops, carries one of them to a position intermediate the two loops and therefore in a position which might prevent the transferrer jaws from advancing far enough to get a good grip on the middle portion of the wire if said recess were omitted. The transferrer carries the looped wire to a position over a cylindrical former 109 which is suitably supported by a bracket portion 110 of the bed 30 (see Fig. 18). The transferrer is also illustrated in Figs. 3, 14, 16 and 17. A slide 111 has secured to its end a block the tip of which forms a lower jaw 112. Said block has ears 113 carrying a pivot 114 on which the upper jaw 115 is mounted. A spring pressed plunger 116 (see Fig. 16) mounted in the heel of the upper jaw tends to close the jaw tips on the wire with sufficient pressure to grasp and carry it. The slide 111 is reciprocated by a cam 117 (see Fig. 1) between the extremes of position indicated by full and dotted lines in Fig. 18, the block or lower jaw 112 passing through a slot 118 in the cylindrical former 109 (see Figs. 2 and 15). The jaws are opened when in advanced position, against the action of spring plunger 116, by a lever 119 having a roll 120 adapted to bear on the heel of the upper jaw, said lever being actuated by a cam 121 on shaft 34 (see Fig. 1). When the looped wire reaches a position over the cylindrical former 109, it is first pressed down by the top die 122 (see Fig. 15) which has a concave lower end, the inner portions of the loops are then pressed downward and inward by the two diagonally-acting dies 123, and finally the outer end portions of the loops are pressed in by the two horizontally-acting dies 124. The top die 122 is reciprocated at the proper times by means of the same lever 58 (see Fig. 3) which actuates the slide 56. The slot 57 in said lever is elongated so as to receive a block or roll carried by the upper end of a slide 125 to the lower end of which the top die 122 is secured. The inclined dies 123 (see Fig. 2) are secured to slides 126 mounted in ways 127 carried by the superstructure, the upper ends of said slides having blocks or rolls 128 engaging slots in levers 129 pivoted at 130 and actuated by cam grooved disks 131 on the shafts 34 and 36 (see Fig. 1). The horizontal dies 124 are secured to slides 132 mounted in suitable ways on the bed of the machine and actuated by cam disks 133 on the shafts 34 and 36 (see Fig. 1).

Figure 2:
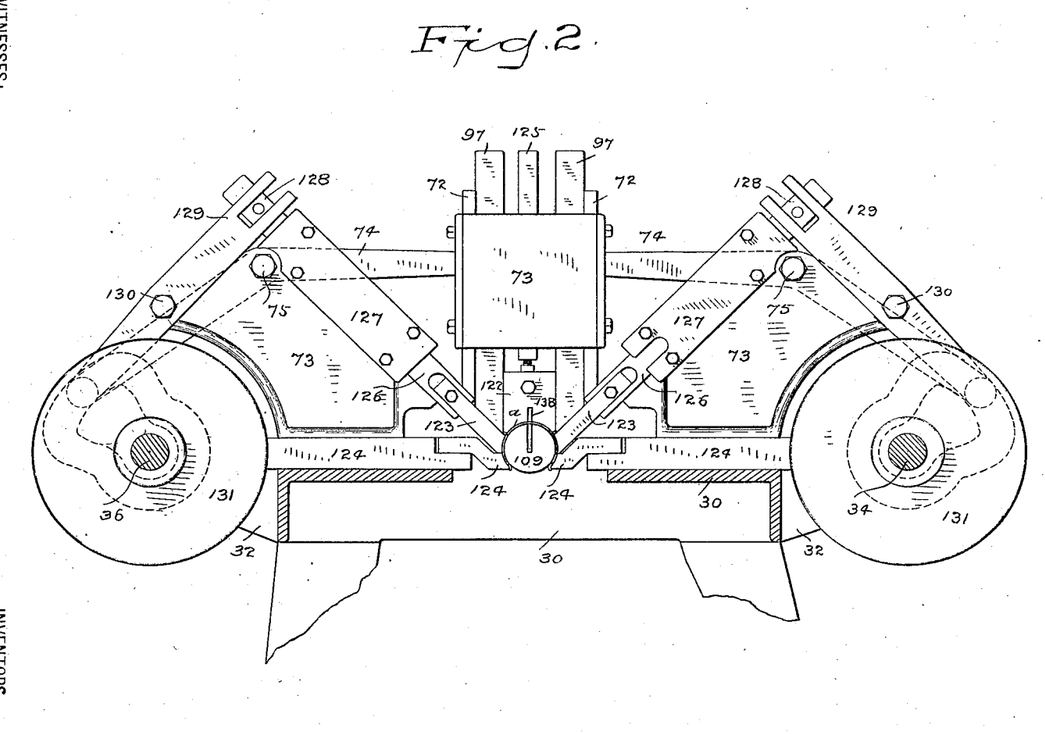
Fig. 2 represents a section on line 2—2 of Fig. 1, but omitting some parts so as to avoid confusion.

The timing of the operation of the members 122, 123 and 124, which are referred to as dies for convenience of description, but which may equally as well be termed bending punches, is in the order of their description given above, and they act successively to bend the wire to the shape illustrated in Figs. 2 and 21. It is removed from the cylindrical former or anvil, and allowed to drop through a space such as indicated at 134, in Fig. 18, by the tips of the transferrer jaws when they advance to take the next wire, said jaws being closed when they first advance, and being opened by the operation of lever 119 just before they reach the full line position in Fig. 18.

Figure 3:
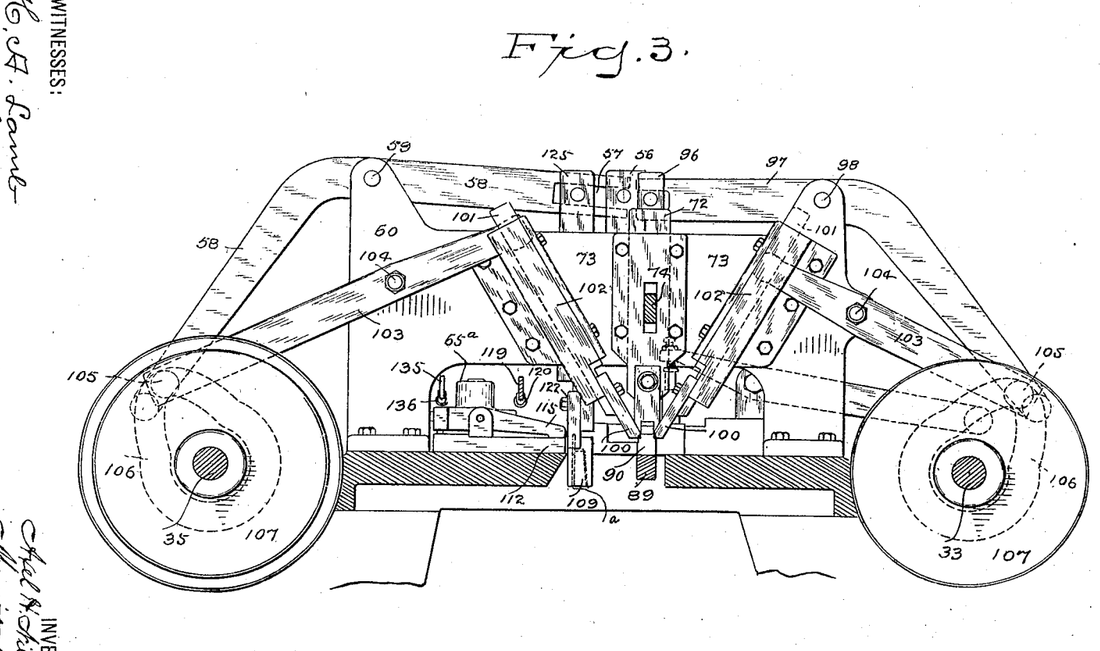
Fig. 3 represents a section on line 3—3 of Fig. 1.
Figure 18:
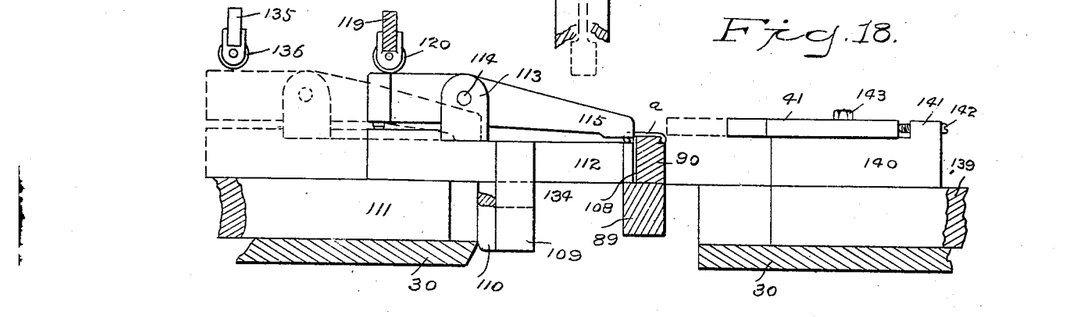
Fig. 18 is a side elevation of the same.

In order that the jaws may be positively opened to release the wire just after the top die 122 presses it down on the cylindrical former 109, a lever 135 is provided, said lever having a roll 136 (see Figs. 3 and 18). Said lever has its outer end extending over the shaft 36 (see Fig. 1), which outer end is elevated at the proper times by a cam 137 on said shaft, to cause the roll 136 to act on the heel of upper jaw 115 just before the transferrer reaches the dotted line position of Fig. 18, to release the wire. It is to be understood that the cam groove in disk 117 which actuates the slide 111 of the transferrer is so shaped as to reciprocate the jaws between the full and dotted line positions of Fig. 18, with an intermediate dwell to hold the wire over the cylindrical former 109 while the upper die 122 is descending. To accommodate the tip of the upper jaw 115 during this dwell, the upper die is formed with a recess 138 (see Figs. 2 and 15).

As has been mentioned, the former block 41 is reciprocated. In Fig. 4 it is in advance position for the coöperation therewith of the punches 62. In Fig. 8 it is omitted and in Figs. 17 and 18 it is in retracted position to enable the later-operating devices to work properly. The said former block is connected to a slide 139. As best seen in comparing Figs. 4, 17 and 18, the slide 139 is provided with a rigid block 140 having a lug 141 through which a set screw 142 passes and bears against the rear edge of former block 41. A bolt 143 passes through a slot 144 in block 41 into block 140. By means of the set screw 142 and bolt 143 the position of the former block 41 relatively to the slide 139 may be accurately adjusted and then secured. The slide 139 is actuated by a cam groove in a disk 145 on shaft 33.

As the general operation of the machine as a whole has been stated at the outset, followed by descriptions of the operations of the different parts of the machine in connection with the description of the structure thereof, further reference to operation of the machine will not be required. It may be stated, however, that it has seemed unnecessary to illustrate and describe the shapes of all of the cam grooves in the disks carried by the shafts, as the formation thereof, in order to impart the requisite movements and relative timing to the formers, punches and dies, will be obvious to any skilled mechanic.

What we claim is:—

1. A wire bending machine comprising in its construction a set of formers and punches and means for automatically actuating them in succession to form substantially rectangular loops at the ends of a piece of wire to then offset portions of the wire to place the ends of the loops in a different plane from that of the rest of the wire, and then impart a curved form to the loops and the portion connecting said loops.

2. A wire bending machine comprising in its construction a set of formers and punches and means for automatically actuating them in succession to form substantially rectangular loops at the ends of a piece of wire, said loops tapering toward one end, to then offset portions of the wire to place the ends of the loops in a different plane from that of the rest of the wire, and then impart a curved form to the loops and the portion connecting said loops.

3. A wire bending machine comprising in its construction four shafts mounted to form a quadrangle and geared together, cams carried by said shafts, slides and punches actuated by said cams, and formers with which said punches coöperate to bend the wire.

4. A wire bending machine comprising in its construction four shafts mounted to form a quadrangle and geared together, cams carried by said shafts, slides and punches actuated by said cams, and movable formers with which said punches coöperate to bend the wire, said movable formers being actuated by cams on said shafts.

5. A wire bending machine comprising in its construction a former block having a horizontal surface and angular recesses at two of its corners, means for placing a length of wire on said surface, means for transferring the wire to a position in front of the recessed portion, and punches for bending portions of the wire into said recesses.

6. A wire bending machine comprising in its construction a movable former block having a horizontal surface and angular recesses at two of its corners, means for placing a length of wire on said surface, means for transferring the wire to a position in front of the recessed portion, punches for bending portions of the wire into said recesses, means for shifting the former block backward after said punches have operated, and formers and punches for further operating on said wire after the recessed former has been shifted.

7. A wire bending machine comprising in its construction a former and bending punches coöperating therewith, a strip having an angular recess and provided with a hinged member to co-act with said recess in forming a guide for the wire, and means for transferring the wire laterally from said recess to shift it to position to be acted upon by said punches and former, the hinged member yielding to permit the shifting of the wire.

8. In a wire bending machine, the combination with means for feeding and cutting the wire, of a guide having a yielding side, means for pushing the wire laterally past said yielding side, and coöperating forming and bending devices for acting on the wire after it is removed from said guide.

9. In a wire bending machine, the combination with a strip having a recess in a lower corner, hinged trap plates for co-acting with said recess to form a guide, means for placing a length of wire in said guide, means for pushing the wire laterally from said recess, and coöperating forming and bending devices for acting on the wire after it is removed from said guide.

10. In a wire bending machine, the combination with a former block, of means for guiding wire onto its upper surface, means for pushing the wire to the edge of said block, and punches coöperating with said block to bend the wire, the pushing means comprising longitudinally movable arms having recesses in alinement with the guide when said arms are at one extreme of movement.

11. A wire bending machine comprising in its construction a former block, means for shifting a wire over the upper surface thereof to its front edge, means for positively depressing the wire to a position in front of the edge of the block, and punches coöperating with the block to bend the wire.

12. A wire bending machine comprising in its construction a former block, punches coöperating therewith to bend the wire, and means for preventing the wire from buckling during the bending operation.

13. A wire bending machine comprising in its construction a former block, a plate movable across the edge of said block and having a shoulder, means for carrying a wire over the edge of the block in position to be engaged by said shoulder on its downward movement, and bending punches coöperating with said former block.

14. A wire bending machine comprising in its construction a former block having recesses in its front corners, punches movable into said recesses to bend the wire, and means independent of the punches for holding the wire intermediate said recesses to prevent it from buckling during the operation of the punches.

15. A wire bending machine comprising in its construction a former block having recesses in its front corners, punches movable into said recesses to bend the wire, and means for preventing the wire from buckling intermediate said recesses, said means comprising a backing plate independent of the punches and spaced from the front edge of the block a distance to accommodate the wire.

16. A wire bending machine comprising in its construction a former block having recesses in its front corners, punches movable into said recesses to bend the wire, and means for preventing the wire from buckling intermediate said recesses, said means comprising a vertically movable plate having a shoulder.

17. A wire bending machine comprising in its construction a former block having recesses in its front corners, means for placing a wire in front of said block, a pair of diagonally-mounted punches, and means for reciprocating said punches.

18. A wire bending machine comprising in its construction a former block having recesses in its front corners, means for placing a wire in front of said block, a pair of diagonally-mounted punches, rack slides carrying said punches, pinions engaging said racks, and cam-actuated rack slides engaging said pinions.

19. A wire bending machine comprising in its construction a former block having recessed front corners, a pair of formers movable to and from positions spaced from the recesses of the block, and punches coöperating with said recesses and the movable formers to form the ends of a piece of wire into loops.

20. A wire bending machine comprising in its construction a former block having recessed front corners, a pair of formers movable to and from positions spaced from the recesses of the block, and punches coöperating with said recesses and the movable formers to form the ends of a piece of wire into loops, said formers and punches being shaped to make the loops substantially rectangular but both tapering in the same direction.

21. A wire bending machine comprising in its construction a former block having recessed front corners, a pair of formers movable to and from positions spaced from the recesses of the block, and punches coöperating with said recesses and the movable formers to form the ends of a piece of wire into loops, the punches being six in number, all diagonally mounted, two of them co-acting with the recesses of the former block, and the other four comprising two pairs the punches of each pair acting successively to bend the wire around the movable formers.

22. In a wire bending machine, the combination with a recessed former block, of shafts having cones provided with cam lugs, means for actuating said shafts and diagonally-mounted slides engaged by said cam lugs and carrying punches to co-act with the recesses of said block.

23. In a wire bending machine, the combination with a recessed former block and a pair of supplemental formers, of a pair of diagonally-mounted punches to co-act with the recesses of the block, a pair of diagonally-mounted punches to co-act with each of the supplemental formers, and means for reciprocating said punches.

24. In a wire bending machine, the combination with a pair of formers, of diagonally-mounted slides having punches to co-act with said formers, said slides having transverse recesses, slides mounted at an angle to the first-mentioned slides and having projections engaging said transverse recesses, and means for reciprocating the last-mentioned slides.

25. A wire bending machine comprising in its construction formers and punches for bending the end portions of a piece of wire into substantially rectangular loops, and means for offsetting portions of the wire to set the longitudinal portions of the loops and the portion of the wire which connects the loops in a different plane from that of the transverse portions.

26. A wire bending machine comprising in its construction formers and punches for bending the end portions of a piece of wire into loops, and means for offsetting portions of the wire to set the longitudinal portions in a different plane from that of the transverse portions, said means comprising a pair of anvils, and punches for engaging portions of the wire at the sides of the anvils.

27. A wire bending machine comprising in its construction formers and punches for bending the end portions of a piece of wire into loops, and means for offsetting portions of the wire to set the longitudinal portions in a different plane from that of the transverse portions, said means comprising a pair of anvils, pressers for holding the wire on said anvils, and punches for engaging portions of the wire at the sides of the anvils.

28. A wire bending machine comprising in its construction formers and punches for bending the end portions of a piece of wire into loops, and means for offsetting portions of the wire to set the longitudinal portions in a different plane from that of the transverse portions, said means comprising a pair of anvils having undercut sides, pressers for engaging portions of the loops, and punches for depressing the side portions of the loops over the undercut sides of the anvils.

29. A wire bending machine comprising in its construction formers and punches for bending the end portions of a piece of wire into loops, and means for offsetting portions of the wire to set the longitudinal portions in a different plane from that of the transverse portions, said means comprising a pair of anvils, pressers having recessed ends to receive transverse portions of the loops, and punches for depressing the side portions of the loops over the sides of the anvils.

30. A wire bending machine comprising in its construction formers and punches for bending the end portions of a piece of wire into loops, and means for offsetting portions of the wire to set the longitudinal portions in a different plane from that of the transverse portions, said means comprising a pair of anvils mounted on a longitudinally movable slide, pressers having recessed ends to receive the transverse portions of the loops, and punches for depressing the side portions of the loops over the sides of the anvils.

31. In a wire bending machine, the combination with formers and punches for bending the end portions of a piece of wire into loops, of anvils and means coöperating therewith for offsetting portions of the wire, and means for stripping the loops from said anvils.

32. In a wire bending machine, the combination with formers and punches for bending the end portions of a piece of wire into loops, of a slide having anvils on which said loops rest, means for reciprocating the slide and anvils, punches for offsetting portions of the wire, and means for preventing the wire from shifting when the anvils are moved out of position.

33. In a wire bending machine, the combination with formers and punches for bending the end portions of a piece of wire into loops, of a slide having anvils on which said loops rest, means for reciprocating the slide and anvils, punches for offsetting portions of the wire, and means for preventing the wire from shifting when the anvils are moved out of position, said means comprising pressers having end recesses which receive transverse portions of the loops.

34. In a wire bending machine, the combination with formers and punches for bending the end portions of a piece of wire into loops, of a curved former and punches or dies coöperating therewith, and means for automatically transferring the looped wire to position to be curved.

35. In a wire bending machine, the combination with formers and punches for bending the end portions of a piece of wire into loops, of a curved former and punches or dies coöperating therewith, and means for automatically transferring the looped wire to position to be curved, said means comprising a reciprocatory pair of jaws, and means for actuating said jaws to cause them to grasp the wire.

36. In a wire bending machine, the combination with formers and punches for bending the end portions of a piece of wire into loops, of a curved former and punches or dies coöperating therewith, and means for automatically transferring the looped wire to position to be curved, said means comprising a slide, jaws carried by the slide, a spring for closing the jaws, means for reciprocating the slide, and means for automatically opening the jaws as they approach the wire.

37. In a wire bending machine, the combination with formers and punches for bending the end portions of a piece of wire into loops, of a curved former having a slot, punches or dies coöperating with the curved former, and a transferrer movable through the slot of the curved former.

38. In a wire bending machine, the combination with formers and punches for bending the end portions of a piece of wire into loops, of a curved former having a slot, punches or dies coöperating with the curved former, and a transferrer movable through the slot of the curved former, said transferrer comprising a reciprocatory pair of jaws movable through the slot of the curved former.

39. In a wire bending machine, the combination with formers and punches for bending the end portions of a piece of wire into loops, of anvils and means coöperating therewith to offset portions of the wire, one of said anvils having a recess in its side, means for further acting on the wire after the offsetting operation, and a transferrer to carry the wire to position for such further treatment, said transferrer extending into said anvil recess when taking hold of the wire.

40. In a wire bending machine, the combination with formers and punches for bending the end portions of a piece of wire into loops, of a curved former having a slot, punches or dies coöperating with the curved former, spring-closed transferrer jaws movable through the slot of the curved former, means for reciprocating said jaws with a dwell when the wire is located over the curved former, and means for opening the jaws when taking the wire and again during said dwell.

41. In a wire bending machine, the combination with two separated sets of co-acting formers and punches for imparting different bends to a wire, of a transferrer for carrying the wire from one set to the other, said transferrer comprising a pair of jaws, means for reciprocating the transferrer, and means for opening the jaws twice during their travel.

42. In a wire bending machine, the combination with two separated sets of co-acting formers and punches for imparting different bends to a wire, of a transferrer for carrying the wire from one set to the other, said transferrer comprising a pair of jaws, means for reciprocating the transferrer, a spring for normally holding the jaws closed, two levers having rolls above the path of movement of the upper jaw, and means for actuating said levers at different times.

43. In a wire bending machine, the combination with a former having curved top and sides, of a plurality of dies or punches and means for actuating them successively toward said former, and means for forming loops in a piece of wire and placing the looped wire in said former.

44. In a wire bending machine, the combination with a cylindrical former, of a top die or punch and two pairs of side dies or punches, means for actuating the top die and then actuating the side dies, and means for forming loops in a piece of wire and placing the looped wire on said former.

45. In a wire bending machine, the combination with a cylindrical former having a radial slot, of a wire carrying device movable through said slot, a top die or punch and side dies or punches, and means for actuating the dies or punches.

46. In a wire bending machine, the combination with a cylindrical former having a radial slot, of a wire carrying device movable through said slot, a top die or punch and side dies or punches, and means for actuating the dies or punches, the top die or punch having a slot or recess to permit it to press the wire on the former before the wire carrying device leaves the slot in the former.

47. In a wire bending machine, the combination with a cylindrical former having a radial slot, of a top die or punch having a slot or recess, a pair of diagonally-mounted dies or punches, a pair of horizontally-mounted punches, and a wire carrying device movable through the slot of the former.

48. In a wire bending machine, the combination with a cylindrical former having a radial slot, of a top die or punch having a slot or recess, a pair of diagonally-mounted dies or punches, a pair of horizontally-mounted punches, and a wire carrying device movable through the slot of the former, a space being provided at one side of the former whereby the said device may push the wire off from the former when on return movement.

49. In a wire bending machine, the combination with a former block and means whereby it may be advanced and retracted, of means for partially bending a piece of wire while said block is advanced, and means for further bending the wire to form complete loops when said block is retracted.

50. In a wire bending machine, the combination with a former block having recesses, punches co-acting therewith to partially bend a piece of wire, means for then retracting the former block, and means for imparting further bends to the wire to form loops.

51. In a wire bending machine, the combination with a former block having recesses, punches co-acting therewith to partially bend a piece of wire, means for then retracting the former block, means for imparting further bends to the wire to form loops, and means for offsetting portions of the wire.

In testimony whereof we affix our signatures in presence of two witnesses.

AXEL H. NILSON.
MAURITZ OLSON.

Witnesses:
  A. M. WOOSTER,
  S. W. ATHERTON.